Figure 5:
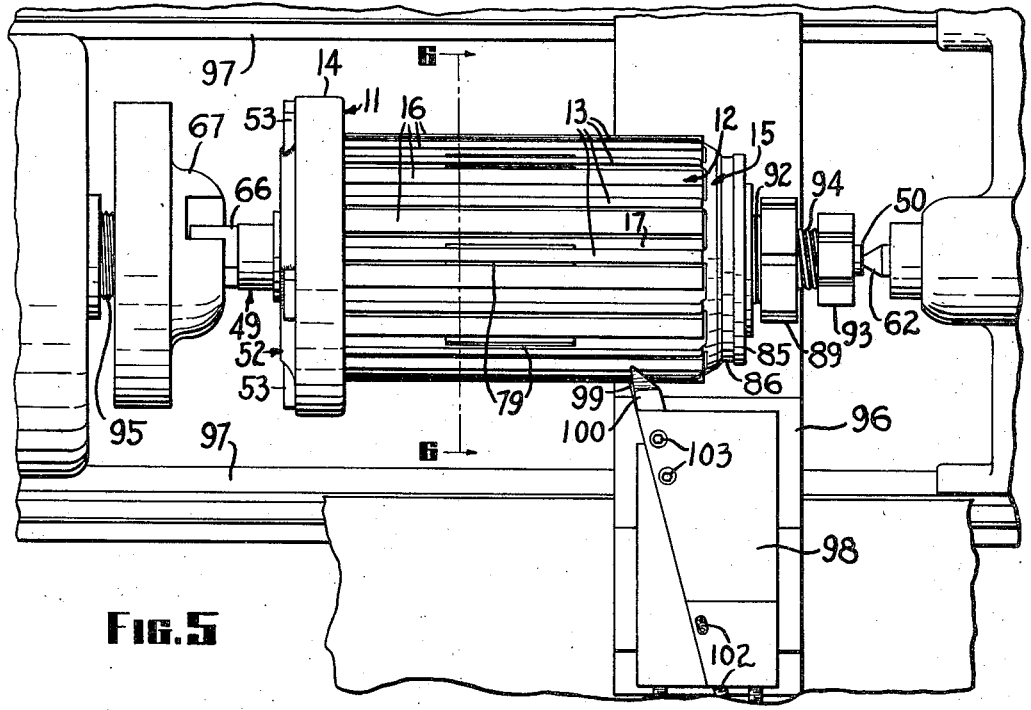

Oct. 16, 1945.   L. A. COREY   2,387,214
METHOD OF MACHINING PARTS
Filed Aug. 1, 1940   3 Sheets-Sheet 1
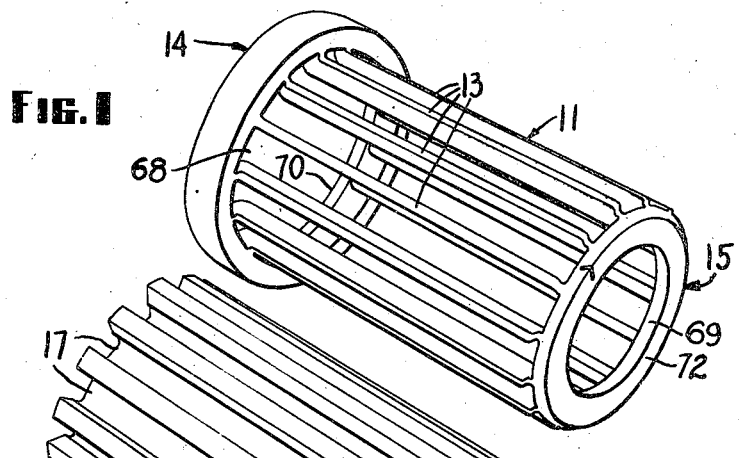
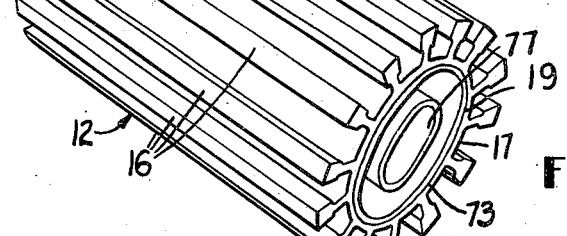
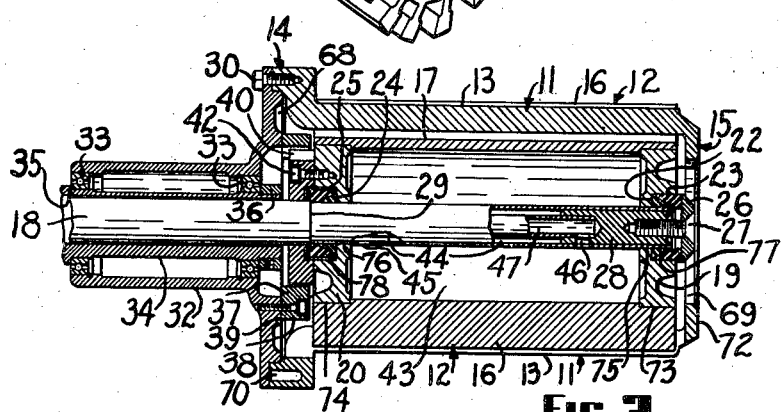
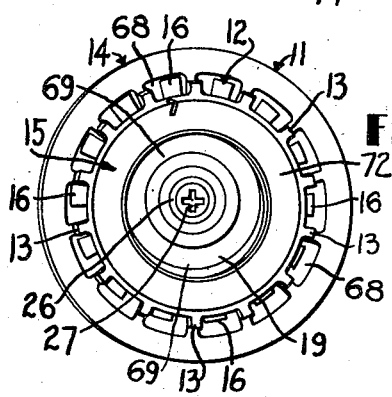
Inventor
LORIN A. COREY
By Charles E. Herrstrom
Attorney

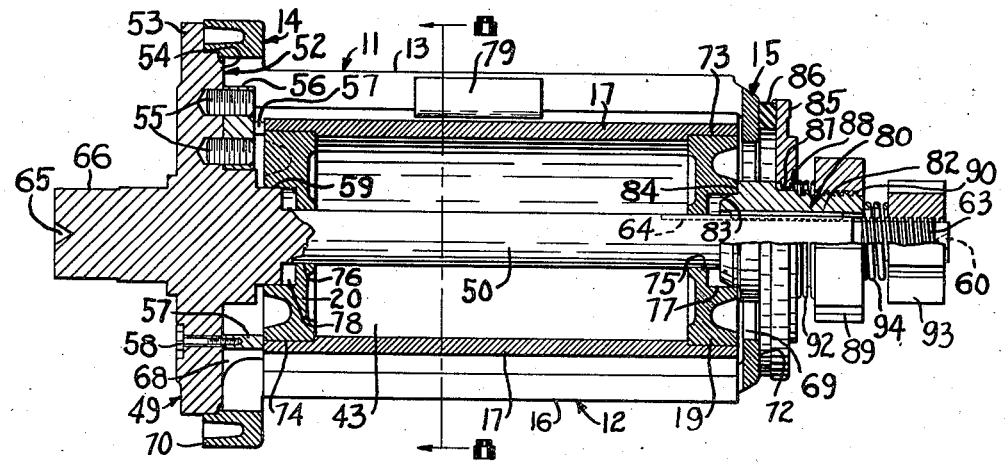

Patented Oct. 16, 1945

2,387,214

UNITED STATES PATENT OFFICE 2,387,214

METHOD OF MACHINING PARTS

Lorin A. Corey, Cleveland Heights, Ohio, assignor to Industrial Rayon Corporation, Cleveland, Ohio, a corporation of Delaware Application August 1, 1940, Serial No. 349,219

5 Claims. (Cl. 29—148)

This invention relates to methods of and means for machining parts. More particularly, the invention is concerned with procedure and apparatus for machining component parts of devices in which said parts interfit and have one or more surfaces which, by reason of mutual cooperation of the parts when assembled together, are required to conform precisely to an identical pattern.

While there are many devices having component interfitting parts which must have identical contours else the successful operation of the device is harmfully affected, the invention will be discussed in connection with a unitary winding device or reel which, through cooperation of interfitting component parts during rotation of the reel winds on a surface of the reel defined by such parts and advances lengthwise of the reel thread or other strand material in a plurality of helical turns. Such reels find wide application, particularly in the continuous processing of thread or the like.

Heretofore, the customary procedure in the manufacture of such reels generally has been to machine separately each individual component part thereof. Such methods not only consume a considerable amount of time and labor for manufacture but also result in the production of reels which, in spite of the degree of care employed in the task of machining the parts individually, involve certain discrepancies and imperfections upon assembly of the parts which impair the operation of said reels. Moreover, where the individual parts are made of different materials, separate machining of the parts causes a very marked degree of variation in size and contour, probably due to the different coefficients of expansion of the materials and the heat developed by the machining operations.

The present invention contemplates among other things the mounting of component parts of such reels, which interfit when the reel is finally assembled, in interfitting relation with each other in a suitable apparatus so that they may be subjected to the same machining operation. According to the invention, moreover, a plurality of machining operations may be performed in a single machine set-up.

In the accompanying drawings which illustrate one of the preferred embodiments of the invention Figure 1 represents a perspective of one of the cooperating elements of a typical device, a winding reel, to which the teaching of the present invention is especially adapted. Figure 2 shows in perspective another element which cooperates with that of Figure 1. Figure 3 is a sectional elevation which illustrates a reel employing the cooperating members of Figures 1 and 2. Figure 4 is an end elevation of the device of Figure 3.

Figure 6:
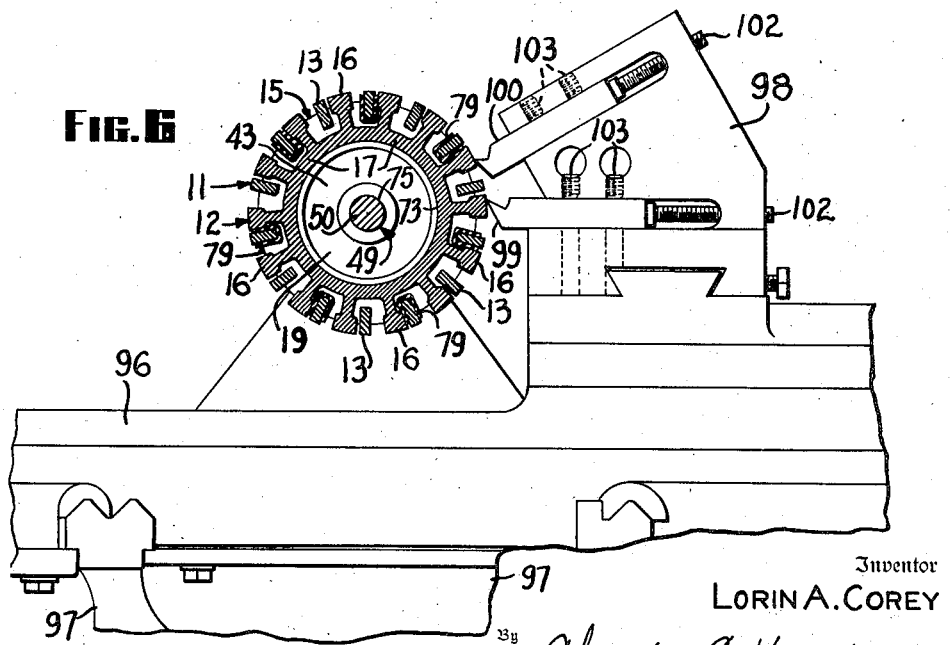

Figure 5 is a plan showing the members of Figures 1 and 2 mounted in a suitable apparatus for simultaneous machining thereof. Figure 6 is a sectional elevation of the machining apparatus taken along line 6—6 in Figure 5. Figure 7 is a sectional elevation on an enlarged scale taken along line 7—7 in Figure 8. Figure 8 is a sectional elevation taken along line 8—8 in Figure 7 and looking in a direction opposite from the section of Figure 6. Figure 9 is an elevation of one form of means for supporting the elements of Figures 1 and 2 in proper relation during the machining operation. Figure 10 is an end elevation of the device of Figure 9.

The reel of Figure 3 is typical of those with which the teaching of the instant invention may be particularly advantageously employed. It comprises at least two members which interfit and cooperate to form the thread-bearing periphery of the reel and operate to advance strand material, hereinafter referred to as thread, axially therealong in the form of a helix made up of a plurality of closely spaced turns. It is desirable that the configuration of all of the reel members going to make up the thread-bearing periphery of the reel conform to a fixed identical pattern. This, as will presently be demonstrated, is particularly important in thread-advancing reels such, for example, as that illustrated in Figure 3 which is employed in drying thread or the like while it traverses the length of the reel.

The illustrated thread-advancing reel is generally of the type shown, described and claimed in Knebusch Patent 2,210,914.

The illustrative reel of Figure 3 comprises two wholly rigid thread-supporting and -advancing members, each of which is circular in cross section; namely, a member 11 which may be termed the "spider" and is shown in Figure 1, and the member 12, which may be termed the "sprocket" and is shown in Figure 2. Spider 11 is made up of a plurality of spaced, longitudinally extending bar members 13 fixed at one end thereof to an annular reinforcing and supporting member 14 and at the other to an annular reinforcing member 15. Sprocket 12 includes a plurality of spaced, longitudinally extending bar members 16 supported by a generally cylindrical body 17. Intervening slots or spaces are formed by the bar members 13 of spider 11 into which are insertable the bar members 16 of the sprocket 12.

When the device is assembled bar members 13 of spider 11 and bar members 16 of sprocket 12 interdigitate, being alternately disposed to form the thread-bearing periphery of the reel. Each of the reel members 11 and 12 is mounted so as rotate about its own axis; the axes of said members are, however, disposed in parallel planes but in inclined relation with respect to each other.

For the purposes of achieving maximum strength, rigidity, and lowest cost of construction it is desirable that the spider 11, as shown, be cast or molded in one piece. For similar reasons, it is desirable that, as shown, the bar members 16 of sprocket 12 be formed integrally with the cylindrical body 17 of said reel member. In the illustrated reel, the body 17 of sprocket 12 is made hollow so that fluid may be circulated therethrough for the purpose of heating the reel for drying purposes. Under such circumstances, it has been found desirable to form the sprocket 12 of the reel comprising the body portion 17 and bars 16 by an extrusion process, according to which a blank of the desired cross section and considerable length is first formed and then cut to the desired lengths for sprockets.

Sprocket 12 is concentrically mounted about a hollow shaft 18 by means of heads 19 and 20 which are tightly fitted into place in each end of the cylindrical body 17 of sprocket 12. Rubber washer 22 held in place by sealing ring 23 seals head 19 to the shaft 18, while rubber washer 24, held in place by sealing ring 25, seals head 20 to shaft 18, thus forming a leak-proof chamber within cylindrical body 17. Sealing cap 26, which contacts sealing ring 23, together with flathead screw 27, which is threaded into plug 28 welded in the end of hollow shaft 18, serve to locate sprocket 12 endwise and firmly hold it in place against shoulder 29 on shaft 18.

Spider 11 is concentrically mounted on and by bolts 30 secured to a supporting member 32 rotatably mounted by means of bearings 33 on frame member 34 with its axis in the desired offset and inclined relationship to shaft 18 journalled in said frame member, only a portion of which is shown. Shoulder 35 on frame member 34, collar 36 fixed to its end, and snap rings serve to secure in proper endwise relation supporting member 32 adjacent bearings 33 on frame member 34.

Drive shaft 18 rotates sprocket 12 fixed thereto, while the reel member formed of spider 11 and its supporting member 32 are rotated from sprocket 12. Suitable means may be provided to insure positive drive of the reel members and to maintain a uniformly spaced relation between the bar members thereof. Such means in the embodiment of Figure 3 comprises an internally toothed gear 37 which is mounted by means of cap screws 38 on the inside of flange 39 of supporting member 32 and engages externally toothed gear 40 mounted by means of cap screws 42 on head 20 of sprocket 12. Bar-to-bar contact of the reel members, which might otherwise cause wear, is avoided, while the two reel members are positively and simultaneously rotated about their own axes.

The inclined relationship between spider 11 and sprocket 12 provides for a definite spacing between the turns of thread wound upon the reel. The offset relation between the axes of reel members 11 and 12 causes the thread turns to be alternately supported first by the bar members of one reel member and thereafter by the bar members of the other reel member. Taken together the above operations serve to advance the thread axially of the reel periphery in a plurality of closely spaced generally helical turns.

As previously indicated, the reel shown in Figure 3 is designed for employment in the drying of thread. This operation is accomplished by supplying a heated fluid such, for example, as hot water, steam or hot air by means of hollow shaft 18 from a suitable source to chamber 43 in sprocket 12. The fluid fills space 44 within shaft 18, escapes through port 45 into chamber 43 and is withdrawn therefrom by means of port 46 into tube 47 disposed within shaft 18. The thread which is in contact with the periphery of the device formed by the interleaved bar members 13 and 16 of spider 11 and sprocket 12 respectively is caused to be dried as it is advanced therealong in the manner previously explained by virtue of the conductivity of the material from which the device is fabricated.

The operation of such a thread-advancing reel in the manipulation of thread or the like thereon, and particularly in the drying of thread, depends, in part at least, upon the degree of conformity of all of the cooperating parts with a fixed pattern representing, in this case, the contour of the thread-bearing periphery. It is imperative, therefore, that the peripheries defined by the bar members of the sprocket and spider, which bar members cooperate to form the thread-bearing periphery of the reel, be accurately machined to correspond exactly, else difficulties arise which seriously affect the quality and uniformity of the thread or the like. If, for instance, the portion of the sprocket supporting a portion of a thread turn should be of a different diameter than the portion of the spider supporting the same thread turn, a change in tension in the thread will occur as the thread passes from one of said members to the other, which change can seriously impair the uniformity of thread being handled by the reel, particularly if it is wet or in the gel state.

Referring now to Figures 9 and 10 of the accompanying drawings, the arbor 49 shown therein is one which may be employed for the purpose of coaxially supporting in the same longitudinal relation that the parts will bear when assembled in the reel the spider 11 and sprocket 12, so that they can be machined in the same operation to identical contours. Arbor 49 comprises shaft 50, and, fixed thereto, an annular disc portion 52 extending transversely of the axis of shaft 50. On the back of disc portion 52 and spaced equidistant from each other about the circumference of said disc portion are secured, as by welding, a number of stops 53. Mounted on face 54 of disc portion 52 by means of set screws 55 are two lugs 56 which are positioned diametrically opposite each other. Arcuate members 57 are secured to the face 54 of disc portion 52 by cap screws 58 inserted from the back of disc portion 52 as shown in Figure 7. A circular locating shoulder 59 disposed coaxially of shaft 50 is integrally formed upon face 54 of disc portion 52.

Shaft 50 of arbor 49 is provided at one end with a conical center bore 60 which is adapted to engage the mounting means of the machine in which the machining operation is to be performed, such, for example, as the dead spindle 62 of a lathe (Figure 5). Screw thread 63 and an axially extending keyway 64 are also provided at the dead center end of shaft 50. The opposite end of shaft 50 is furnished with conical center bore 65 and squared portion 66 adapted to engage a driving dog 67 at the drive end of the aforementioned lathe. The remainder of the parts comprising the mounting are best explained by describing the assembling of the parts for the machining operation.

It should be noted at this point that although they are not strictly a part of the procedure of the present invention, certain machining operations must first be performed individually upon the spider and sprocket assemblies before they are ready to be mounted upon arbor 49. On the spider, such operations include boring to size the circular openings 68 and 69 and finishing the end faces 70 and 72 of annular members 14 and 15 respectively. On the sprocket, such preliminary operations include facing either end of sprocket 12 to size and counterboring openings 73 and 74 therein which accommodate heads 19 and 20 respectively. Heads 19 and 20 are next faced to the proper outside diameter and holes 75 and 76 respectively rough-bored therein and recesses 77 and 78 respectively are counterbored therein to a diameter somewhat smaller than that finally desired. Into the aforementioned counterbored openings 73 and 74 in the ends of body portion 17 of sprocket 12 the heads 19 and 20 are now shrunk and pressed, after which holes 75 and 76 as well as recesses 77 and 78 thereof are finish-bored and counterbored to exact size. Spider 11 and sprocket 12 are now ready for assembly upon arbor 49.

Sprocket 12 is first placed upon arbor 49 with shaft 50 thereof passing through holes 75 and 76 of heads 19 and 20 respectively until recess 78 in head 20 engages locating shoulder 59 and the face of said sprocket seats against arcuate members 57. Alternate bar members 13 of spider 11 before it is mounted upon arbor 49 are fitted with removable rubber shock absorbing members 79 utilized only during a machining operation which take the form of short pieces of channel-shaped rubber a few inches in length. Thereafter spider 11 is fitted over sprocket assembly 12 so that bars 13 of the former are alternately arranged with respect to bars 16 of the latter and are spaced apart by means of the channel-shaped rubber members 79 in the fashion illustrated in Figure 8.

Spider 11 is positioned so that opening 68 in annular member 14 is adapted to slide over the outer circumference of disc portion 52 of arbor 49, which it closely fits. In this manner, the end face 70 of annular member 14 of spider 11 seats against stops 53 on disc portion 52. This arrangement will now cause one or both of lugs 56 to engage in driving relation a bar member 13 of the set comprising spider 11, as will be apparent from Figure 8 of the drawings.

With one end of the assembly located in the fashion just described centering member 80 is slipped over the threaded end of shaft 50 of arbor 49 in such fashion that its key 82 engages keyway 64 in said shaft so as to prevent rotation of the centering member 80 with respect to the shaft. Tapered nose portion 83 of centering member 80 is adapted to engage recess 77 and shoulder 84 of said member seats against the face of head 19 of sprocket 12. Thus, when centering member 80 is pressed against sprocket 12, it is held firmly in place against the face of disc portion 52 of arbor 49 and the possibility of endwise movement thereof during the machining operation is eliminated.

Mounted on and extending radially of centering member 80 is an annular disc member 85 to one face of which a rubber gasket 86 is vulcanized. A key 87 forming part of said annular disc 85 and engaging a keyway 88 on the outer circumference of centering member 80 is adapted to prevent rotation of said annular disc about the centering member. An adjusting nut 89 is threaded on the threaded portion 90 of centering member 80 and serves to compress spring 92 against the face of annular disc 85, which is thus urged, through its rubber gasket 86, against face 72 of annular member 15, thereby insuring positive endwise location of spider 11 when centering member 80 is urged against sprocket 12.

This is accomplished by a locking nut 93 threaded on the end of shaft 50 of arbor 49 which compresses a spring 94 against the end of centering member 80. Care must be taken in the adjustment of adjusting nut 89 and locking nut 93 so that the pressure against the ends of both spider 11 and sprocket 12 does not cause the bar members thereof to be bowed outward. To insure against this it is desirable to test the mounting by trying to twist both spider 11 and sprocket 12 by hand and setting up adjusting nut 89 and locking nut 93 individually to the point where it is just possible to move said spider and sprocket members.

As previously explained, lugs 56 secured to disc portion 52 of said arbor 49 engage one or more bar members 13 of spider 11 and thus insure positive rotation of spider 11. Sprocket 12 is positively rotated with arbor 49 by reason of the intermeshing relation between bar members 13 and 16 of positively driven spider 11 and said sprocket respectively. Rubber members 79 applied to alternate bar members 13 of spider 11 serve, among other things, to cushion the contact of said spider bar members 13 with bar members 16 of sprocket 12.

After the above-described mounting operation is completed, the assembly is ready to be inserted in appropriate apparatus for machining the individual bar members of both the spider and sprocket. Any suitable form of machining apparatus may be employed and is intended to be included within the scope of the instant invention. The inventive concept may be applied, for instance, to grinding or buffing machinery or the like but, for the sake of simplicity, is illustrated as being employed in a machine lathe.

Figure 5 illustrates a portion of a lathe which is provided with a driving dog 67 on its live spindle 95 which will accommodate squared end 66 of shaft 50 of arbor 49. Dead spindle 62 of the lathe engages center bore 60 of shaft 50 and cooperates with the live spindle 95 which engages center bore 65 to provide an axis about which the assembly may be rotated by dog 67. Carriage 96 mounted on machine bed 97 of the lathe carries a tool holder 98 in which may be adjustably positioned one or more tools such, for example, as roughing tool 99 and a finishing tool 100 by means of suitable adjustment screws 102. Said tools may be locked in any desired position by set screws 103. Roughing tool 99 and finishing tool 100 are preferably so disposed that the cut taken by finishing tool 100 immediately follows that just made by roughing tool 99, thereby completing both the roughing and finishing operations in one passage of the tool holder in a direction parallel to the axis of the work.

Rubber members 79 which are applied to bars 13 of spider 11 not only facilitate the spacing of the individual bars of each set in the manner hereinbefore described but also tend to cushion the vibrations set up by the intermittent cutting action of the tools on the bars. Thus nicking or irregular cutting of the bars which would result from such intermittent cutting and which would result in an extremely rough thread-bearing surface harmful to the thread is eliminated.

As previously indicated the contour of each of the component parts of the device being manufactured may be formed to other desired shapes than the cylindrical shape shown, depending upon the use to which the device is to be put. For example, the thread-advancing reel of Figure 3 may be employed for the drying of thread under conditions permitting shrinkage of the thread in which case it may be found desirable to provide a periphery which is tapered toward the unsupported end of said reel, thereby permitting the thread or the like to shrink as it is dried during its advance along the reel. A contour bar or template may be attached to the machining apparatus in the known manner for the purpose of guiding the cutting tool in forming peripheries of a desired shape.

Variations such as those hereinbefore described as being traceable to separate machining of component parts of such devices as those to the manufacture of which the present invention is adapted are found in general to be even more pronounced in instances where the contours are other than ordinary cylindrical surfaces. This will be readily apparent from the fact that when cooperating parts are assembled together, the breaks occurring in such irregular contours of several component parts often fail to coincide. It is not uncommon for such occurrences in thread-advancing reels, for instance, to cause uneven shrinkage or stretching of thread or the like wound thereon and often causes underwinding of adjacent turns frequently resulting in breakage of the thread or the like.

Devices comprising a plurality of component parts which must cooperate to form one or more working or contact surfaces which are to be free from variation therebetween can be machined according to the teaching of the present invention so as to conform exactly to a fixed pattern without any discrepancies whatsoever occurring therein.

Various modifications in the method and apparatus hereinbefore described will be apparent and may readily be made without departing from the spirit of the present invention. As has been pointed out, the teaching of the instant invention is not intended to be confined solely to devices the component parts of which have cylindrical contours but finds equal application in the manufacture of devices the parts of which have other contours of generally circular cross section. Moreover, suitable changes in the order of assembling the parts in the mounting means may likewise be made. For instance, the rubber shock absorbing means 79 may be applied to bars 13 of spider 12 after its assembly in the mounting rather than in the manner described.

Any suitable type of apparatus may be employed in the machining operation ranging from one in which the work is mounted for rotation with respect to the cutting element to one in which the cutting element is rotated while the work remains stationary. By the term "cutting element" is meant any convenient means for shaping the work to conform to a desired contour, whether it be a cutting tool of the type shown and described above, a grinding wheel, a buffing wheel, or even a manually held tool, such as a file or the like.

It is intended that the patent shall cover, by suitable expression in the appended claims, whatever features of patentable novelty reside in the invention.

What is claimed is:

1. The method of machining in the same operation a member of generally circular cross section provided with a plurality of longitudinally extending spaced bars forming slots and a second member of generally circular cross section provided with a plurality of bars adapted to project into the slots of said first member so that both members in combination are generally circular in cross section, said slots being wider than the projecting portion of said bars so that said bars are positioned therein in spaced relationship with respect to the bars forming said slots, said method comprising fitting said members one within the other, cushioning the bars of one of the members to prevent contact between them and the bars of the other member forming the slots during the machining operation and bringing the outer surface of said members into operating engagement with a cutting element.

2. The method of machining in the same operation a member of generally circular cross section provided with a plurality of longitudinally extending spaced bars forming slots and a second member of generally circular cross section provided with a plurality of bars adapted to project into the slots of said first member so that both members in combination are generally circular in cross section, said slots being wider than the projecting portion of said bars so that said bars are positioned therein in spaced relationship with respect to the bars forming said slots, said method comprising fitting said members one within the other, coaxially mounting said members, cushioning the bars of one of the members to prevent contact between them and the bars of the other member forming the slots during the machining operation and bringing the outer surface of said members into operating engagement with a cutting element.

3. The method of machining in the same operation a member of generally circular cross section provided with a plurality of longitudinally extending spaced bars forming slots and a second member of generally circular cross section provided with a plurality of bars adapted to project into the slots of said first member so that both members in combination are generally circular in cross section, said slots being wider than the projecting portion of said bars so that said bars are positioned therein in spaced relationship with respect to the bars forming said slots, said method comprising fitting said members one within the other, cushioning the bars of one of said members to prevent contact between them and the bars of the other member forming the slots during the machining operation, coaxially mounting said members and rotating said members with respect to a cutting element, bringing said cutting element into operating engagement with the outer surface of said members and moving said cutting element axially with respect to said members.

4. The method for machining a combination of separable parts comprising interfitting in an interdigitating manner at least two formed generally circular members each having peripheries of spaced, longitudinal bars, independently supporting each of said members and forming of them a combined generally circular cylinder, and bringing the surface of the combined cylinder into operating engagement with a cutting element.

5. The method for machining a combination of separable parts comprising interfitting in an interdigitating manner at least two formed generally circular members each having peripheries of spaced, longitudinal bars, the members having substantially identical outside diameters and different internal diameters, coaxially independently supporting each of said members to prevent contact between the interdigitating bars and forming of the members a generally circular cylinder, and bringing the combined surface into operating engagement with a cutting element.

LORIN A. COREY.